United States Patent
Nagai (12)

(10) Patent No.: US 6,619,963 B2
(45) Date of Patent: Sep. 16, 2003

(54) STRUCTURE FOR CONNECTING ELECTRIC WIRES TO A LAMP UNIT

(75) Inventor: Kentaro Nagai, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/062,450

(22) Filed: Feb. 5, 2002

(65) Prior Publication Data

US 2002/0106929 A1 Aug. 8, 2002

(30) Foreign Application Priority Data

Feb. 6, 2001 (JP) ....................................... P2001-029675

(51) Int. Cl.[7] .............................................. H01R 33/00
(52) U.S. Cl. ........................ 439/34; 439/397; 439/401; 439/419; 439/36
(58) Field of Search ............................ 439/34, 36, 397, 439/401, 419

(56) References Cited

U.S. PATENT DOCUMENTS 5,823,816 A * 10/1998 Uchida et al. .............. 439/419
6,086,408 A * 7/2000 Tanigawa .................... 439/419
6,447,301 B1 * 9/2002 Hayashi ........................ 439/34

* cited by examiner

Primary Examiner—Tho D. Ta
(74) Attorney, Agent, or Firm—Sughrue Mion, PLLC

(57) ABSTRACT

A switch accommodating recess (13) capable of accommodating a switch assembly (30) and a wire accommodating recess (15) capable of positioning an FFC (20) which is electrically connected to a room lamp are provided in a vehicle compartment-side surface of an insulating housing 11 in the room lamp which is fitted in a lamp fitting window having an opening in a roof trim covering a vehicle body panel. At the same time as bus bars (21) are mounted on the vehicle compartment-side surface of the insulating housing (11), press-connecting terminals (21b) are subjected topress fitting connection to the FFC (20) positioned in the wire accommodating recess (15).

5 Claims, 8 Drawing Sheets

STRUCTURE FOR CONNECTING ELECTRIC WIRES TO A LAMP UNIT

BACKGROUND OF THE INVENTION

The present invention relates to a structure for connecting electric wires of a lamp unit, and more particularly to improvements in the structure for connecting electric wires of a lamp unit which is installed in a lamp mounting window provided in an interior wall member covering a vehicle body panel.

In cases where a lamp unit such as a room lamp or a curtsey lamp is installed on an interior wall member such as a roof trim or a door trim covering a vehicle body panel, the lamp unit is generally installed in a lamp mounting window which is open in the interior wall member.

A room lamp 60 shown in FIG. 9 is a lamp unit which is installed in the lamp mounting window (not shown) which is open in a roof trim covering an unillustrated body ceiling.

The room lamp 60 is mainly comprised of a lamp housing 61, a light bulb 63, and a cover lens 62, and after the light bulb 63 is fitted in a lamp fitting portion of the lamp housing 61, the cover lens 62 is fitted to the lamp housing 61.

As shown in FIG. 10, one end portion of a wire harness 67 is directly subjected to press fitting connection to press connecting terminals 66 of wire connecting terminals 69, which are disposed in a wire-connecting recessed portion 65 of the lamp housing 61, by means of a holding piece 68. The light bulb 63 is electrically connected to the wire harness 67 which is routed on the body ceiling through the bus bars 69 serving as the wire connecting terminals provided inside the lamp housing 61.

The lamp housing 61 is directly mounted to the body ceiling by means of bolts 64 by using mounting brackets 61a provided on an outer periphery of a bottom plate. As for the wire harness 67 which is integrated with the room lamp 60, the other end portion extending in the downward direction of the vehicle body through a predetermined route is connected to another wire harness by a connector. Next, the roof trim (not shown) is installed and fixed to the body ceiling, thereby completing the assembly. At this time, as for the room lamp 60, the outer surface (the lower surface in FIG. 9) of the cover lens 62 is exposed to the interior of the vehicle compartment through an opening in the roof trim.

With the above-described related room lamp 60, when one end portion of the wire harness 67 is subjected to press connecting connection to the press connecting terminals 66 disposed in the lamp housing 61, the wire harness 67 is likely to undergo positional offset relative to the press connecting terminals 66. Hence, the press fitting connection action during the press fitting connection operation and the holding of the end portion of the wire harness 67 need to be performed very carefully.

In addition, in a case where wiring is provided for a plurality of lamp units such as the aforementioned room lamp 60 and a map lamp by the wire harness 67 and is integrated as a roof harness, if the connected position of the wire harness 67 which is secured to the wire connecting terminals of each lamp unit undergoes positional offset with respect to the wire connecting terminals along the longitudinal direction, there is a possibility that each lamp unit cannot be installed at a proper position of the body ceiling.

In a case where the room lamp 60 has switching parts capable of switching the operating state of the light bulb 63 fitted in the lamp housing 61, there is a problem in that the number of component parts increases and a greater number of assembling steps is involved, leading to higher cost.

SUMMARY OF THE INVENTION

Accordingly, the object of the invention is to provide an inexpensive lamp unit which makes it possible to easily and accurately position and secure the electric wires to the wire connecting terminals of the lamp unit, thereby overcoming the above-described problems.

In order to solve the aforesaid object, the invention is characterized by having the following arrangement.

(1) A structure for connecting an electric wire to a lamp unit installed on a lamp fitting window formed through an interior wall member covering a vehicle body panel, the lamp unit comprising:
  a insulating housing having a vehicle compartment-side surface;
  a wire accommodating recess, for positioning the electric wire installed on a vehicle body panel side of the interior wall member, provided on the vehicle compartment-side surface; and
  a wire connecting terminal subjected to press fitting connection to the wire positioned in the wire accommodating recess.

(2) The structure according to claim 1, wherein the lamp unit includes:
  a switch accommodating recess, for accommodating switch components, provided in the vehicle compartment-side surface in a vicinity of the wire accommodating recess; and
  a switching circuit assembly which includes the wire connecting terminals and is provided with switch contacts capable of switching over an operating state of a bulb attached to the insulating housing by the switch components accommodated in the switch accommodating recess.

(3) The structure according to claim 1, wherein
  the wire connecting terminal includes a press connecting terminal for connection to the wire, and a bulb contact for connection to a bulb.

(4) The structure according to claim 1, wherein
  when the wire is accommodated in the wire accommodating recess and is electrically connected to the wire connecting terminal, the wire is held between the wire connecting terminal and the insulating housing.

(5) The structure according to claim 1, wherein a plurality of the wires are accommodated in the wire accommodating recess.

(6) The structure according to claim 5, wherein at least one guide groove is formed in the wire accommodating recess to define a plurality of grooves for respectively accommodating the plurality of the wire.

According to the above-described construction, since the wire accommodating recess is formed in the vehicle compartment-side surface of the insulating housing in the lamp unit, and the wires are routed in advance in the wire accommodating recess, the routing and holding of the wires with respect to the insulating housing and the positioning and holding of the wire connecting terminals at the time of press fitting connection are facilitated.

According to the above-described construction, the switch assembly is provided in the vicinity of the wire accommodating recess provided in the vehicle compartment-side surface of the insulating housing.

Accordingly, connecting portions of the wire connecting terminals subjected to press fitting connection to the wires routed in the wire accommodating recess and the switch components accommodated in the switch accommodating recess can be held and fixed by being covered with a single cover.

DETAILED DESCRIPTION OF PREFERRED EMBODIMENTS

Referring now to the accompanying drawings, a detailed description will be given of the structure for connecting electric wires of a lamp unit in accordance with an embodiment of the invention.

Figure 1:
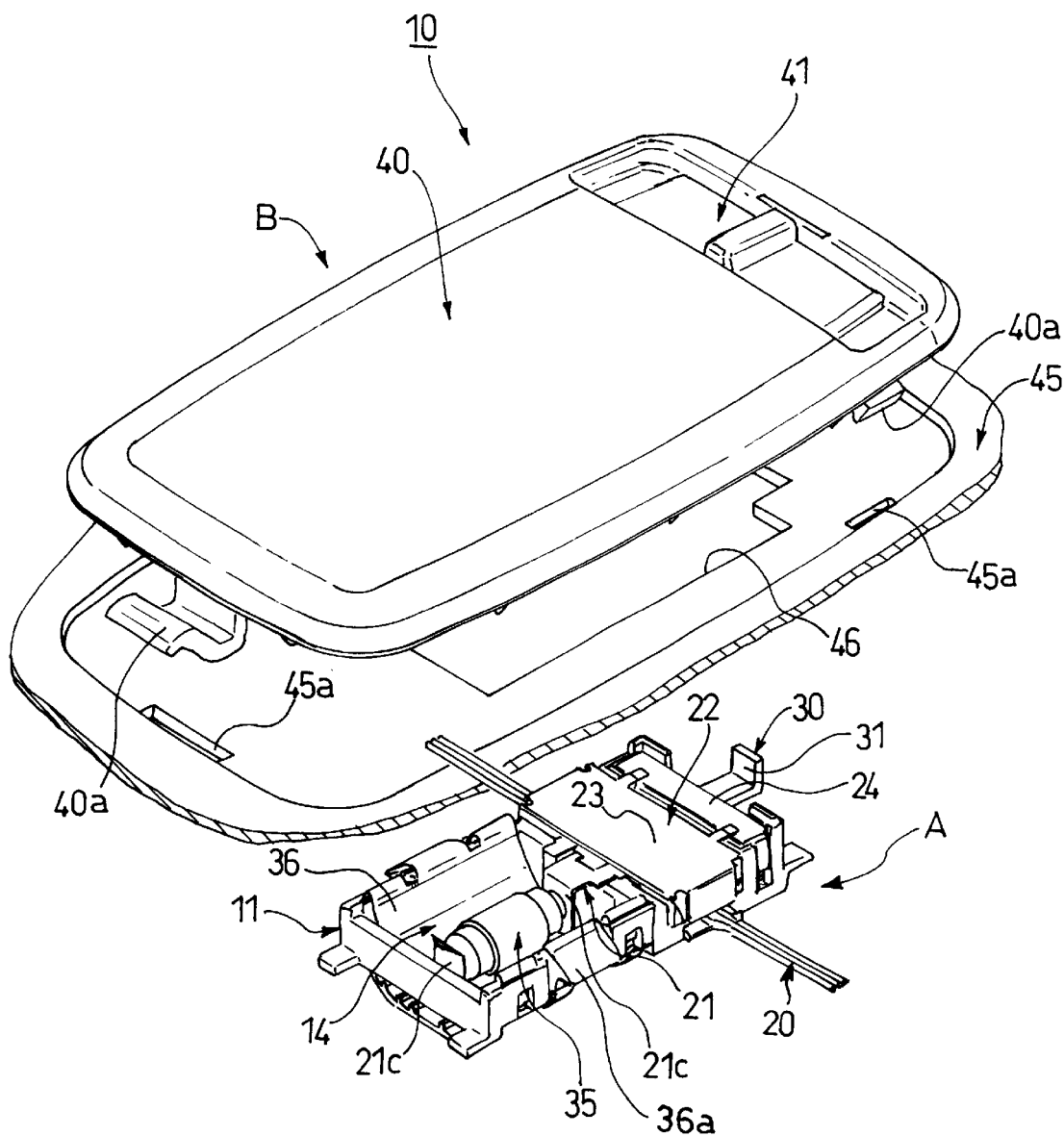
FIG. 1 is a perspective view explaining the process of installing a lamp unit on a roof trim in accordance with an embodiment of the invention.

FIG. 1 is a perspective view explaining the process of installing a lamp unit on a roof trim in accordance with the embodiment of the invention. FIGS. 2 to 6 are perspective views of essential portions for explaining the process of assembling a lamp function portion in the lamp unit shown in FIG. 1.

A room lamp 10 in this embodiment shown in FIG. 1 is a lamp unit which is installed in a lamp mounting window having an opening in a roof trim 45 serving as an interior wall member covering an unillustrated vehicle body panel.

As shown in FIGS. 1 to 6, the room lamp 10 is a lamp unit comprised of a lamp function portion A which consists of an insulating housing 11 in which switch component parts are provided together with bus bars 21 making up a switching circuit assembly, a light bulb 35 fitted between a pair of bulb contacts 21c of the bus bars 21, and a reflector 36, and which is mounted on the vehicle body panel side of the roof trim 45, as well as a design portion B which is a cover lens 40 and is mounted on the vehicle compartment side of the roof trim 45.

Figure 2:
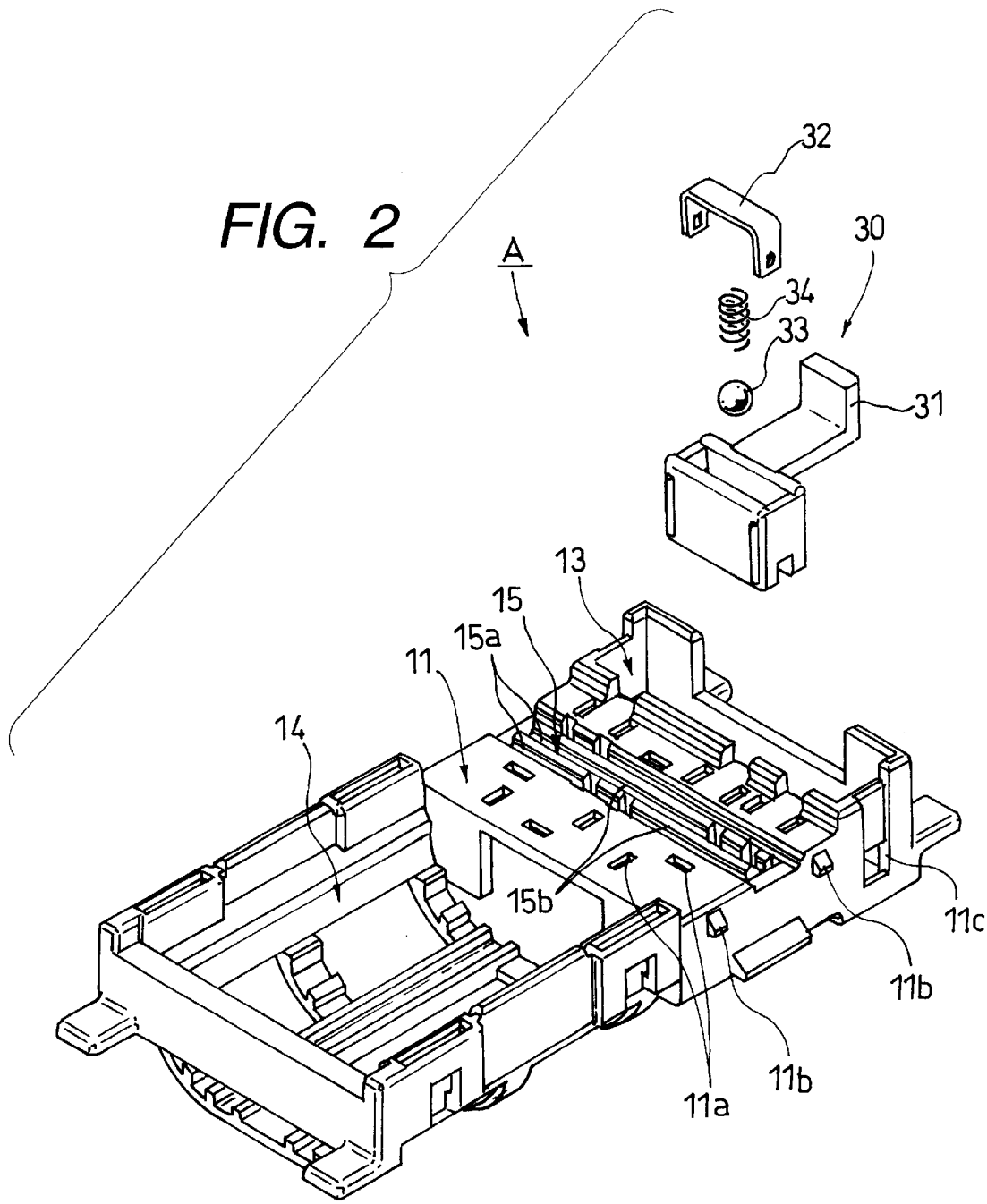
FIG. 2 is a perspective view of the essential portions for explaining the process of assembling the lamp function portion in the lamp unit shown in FIG. 1.
Figure 3:
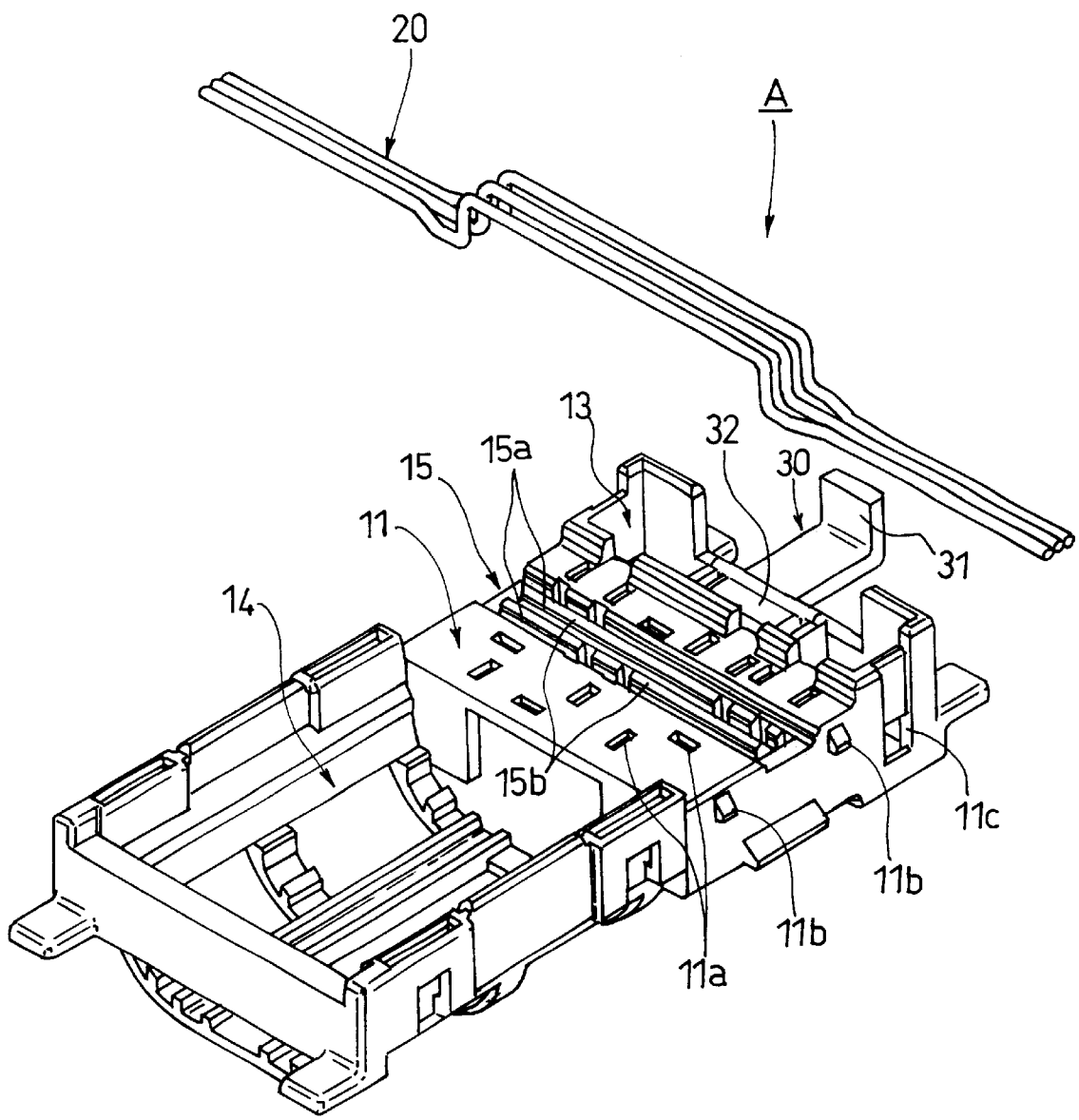
FIG. 3 is a perspective view of the essential portions for explaining the process of assembling the lamp function portion in the lamp unit shown in FIG. 1.

As shown in FIGS. 2 and 3, provided in the vehicle compartment-side surface (the upper surface in FIGS. 2 and 3) of the insulating housing 11 are a switch accommodating recess 13 capable of accommodating a switch assembly 30 of the lamp unit 10, a wire accommodating recess 15 capable of positioning a flexible flat cable (FFC) 20 serving as an electric line which is routed on the vehicle body panel side of the roof trim 45 and is electrically connected to the lamp unit 10, and a bulb accommodating portion 14.

First, as shown in FIG. 2, the switch assembly 30 is accommodated in the switch accommodating recess 13 of the insulating housing 11.

The switch assembly 30 is for effecting intermittent operation of the switching circuit capable of switching over the operating state (the on/off state and the door interlock) of the bulb 35, and consists of a slider body 31 with which a switch lever is integrated, a contact 32, a ball 33, a spring 34, and the like.

In a state in which this switch assembly 30 is accommodated in the switch accommodating recess 13 of the insulating housing 11, the switch assembly 30 is held displaceably and undetachably in the switch accommodating recess 13 by means of a switch cover portion 24 of a cover 22 which will be described later. Thus, the switch assembly 30 constitutes a switching circuit assembly together with the bus bars 21 which will be described later.

Next, as shown in FIG. 3, the FFC 20 is positioned in the wire accommodating recess 15 of the insulating housing 11.

Figure 7:
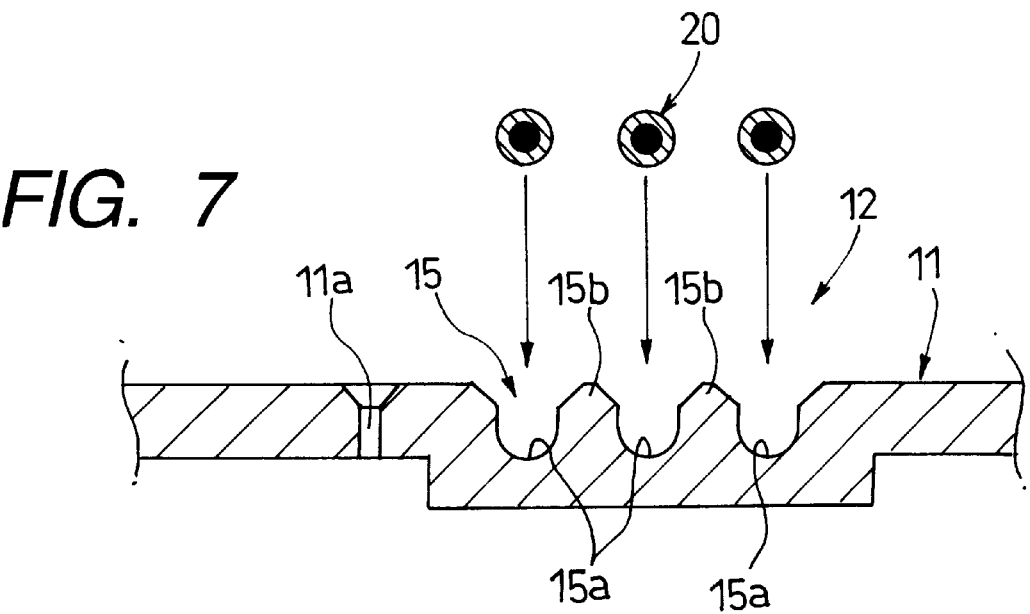
FIG. 7 is an enlarged cross-sectional view of an essential portion illustrating a wire accommodating recess of an insulating housing shown in FIG. 4.

As shown in FIG. 7, the wire accommodating recess 15 has a plurality of U-grooves 15a provided in a number matching the number of wires of the FFC 20 and a plurality of guide projections 15b provided between adjacent ones of the U-grooves 15a. Each U-groove 15a is formed in conformity with the cross-sectional shape of the wire of the FFC 20, and the wires of the FFC 20 are positioned and held by being respectively guided by the guide projections 15b and by being pushed into the respective U-grooves 15a.

Figure 8A:
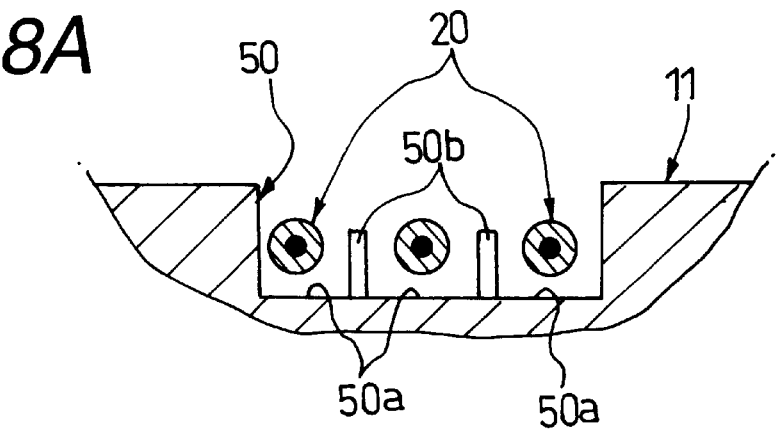
FIGS. 8A and 8B are enlarged cross-sectional views of the essential portion illustrating modifications of the wire accommodating recess shown in FIG. 7.
Figure 8B:
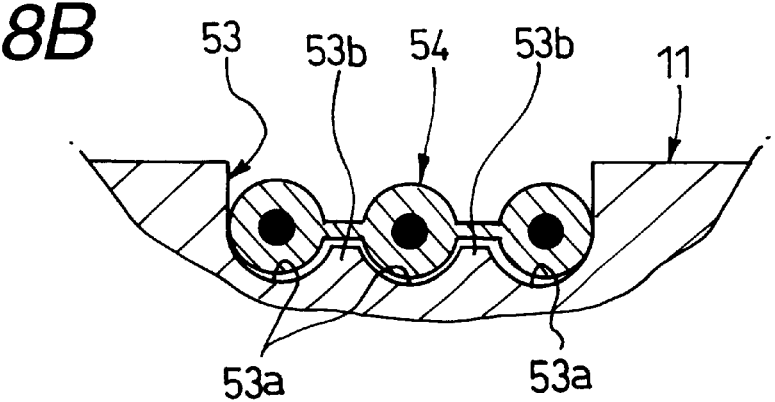
Figure 9:
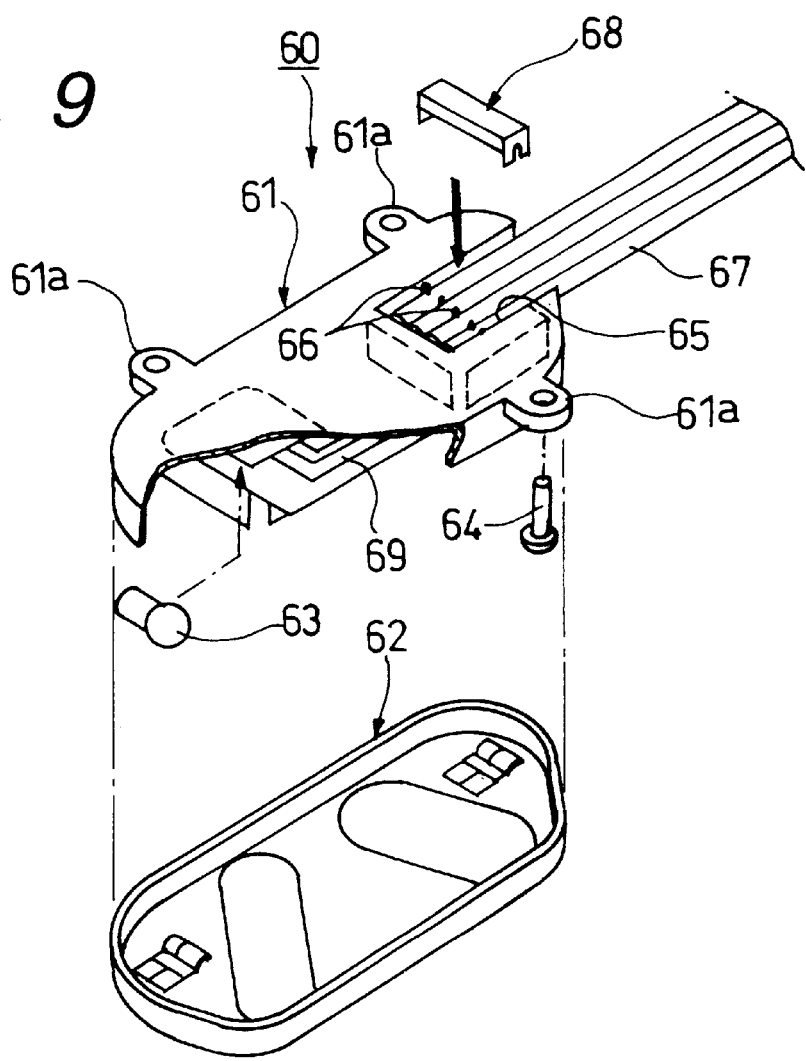
FIG. 9 is an exploded perspective view of a related lamp unit.
Figure 10:
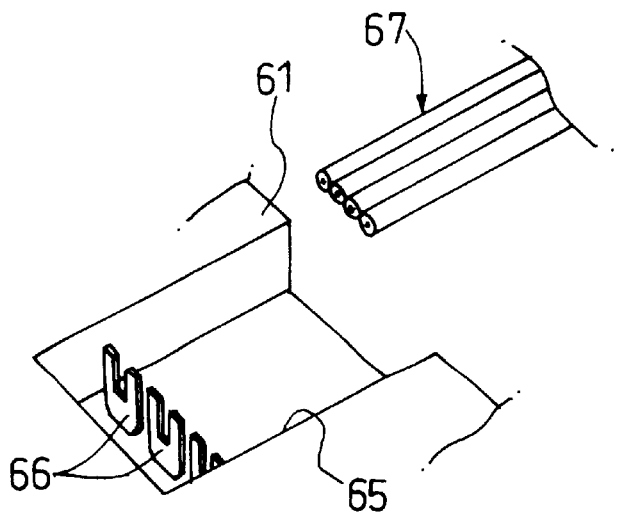
FIG. 10 is an exploded perspective view of an essential portion of the related lamp unit shown in FIG. 9.

It should be noted that the internal structure of the wire accommodating recess 15 is appropriately altered in accordance with the construction and the like of the FFC 20. Namely, U-grooves 50a maybe formed by uprightly providing guide ribs 50b in a recess 50 having a rectangular cross section, as shown in FIG. 8A. Alternatively, as shown in FIG. 8B, an arrangement may be provided such that a wire accommodating recess 53 is provided with guide projections 53b which are low in height in correspondence with an FFC 54 having a structure in which the wires are connected together, so as to accommodate the wires of the FFC 54 in U-grooves 53a in such a manner as to avoid the interference between the connected portion of each wire and each guide projection 53b.

Figure 4:
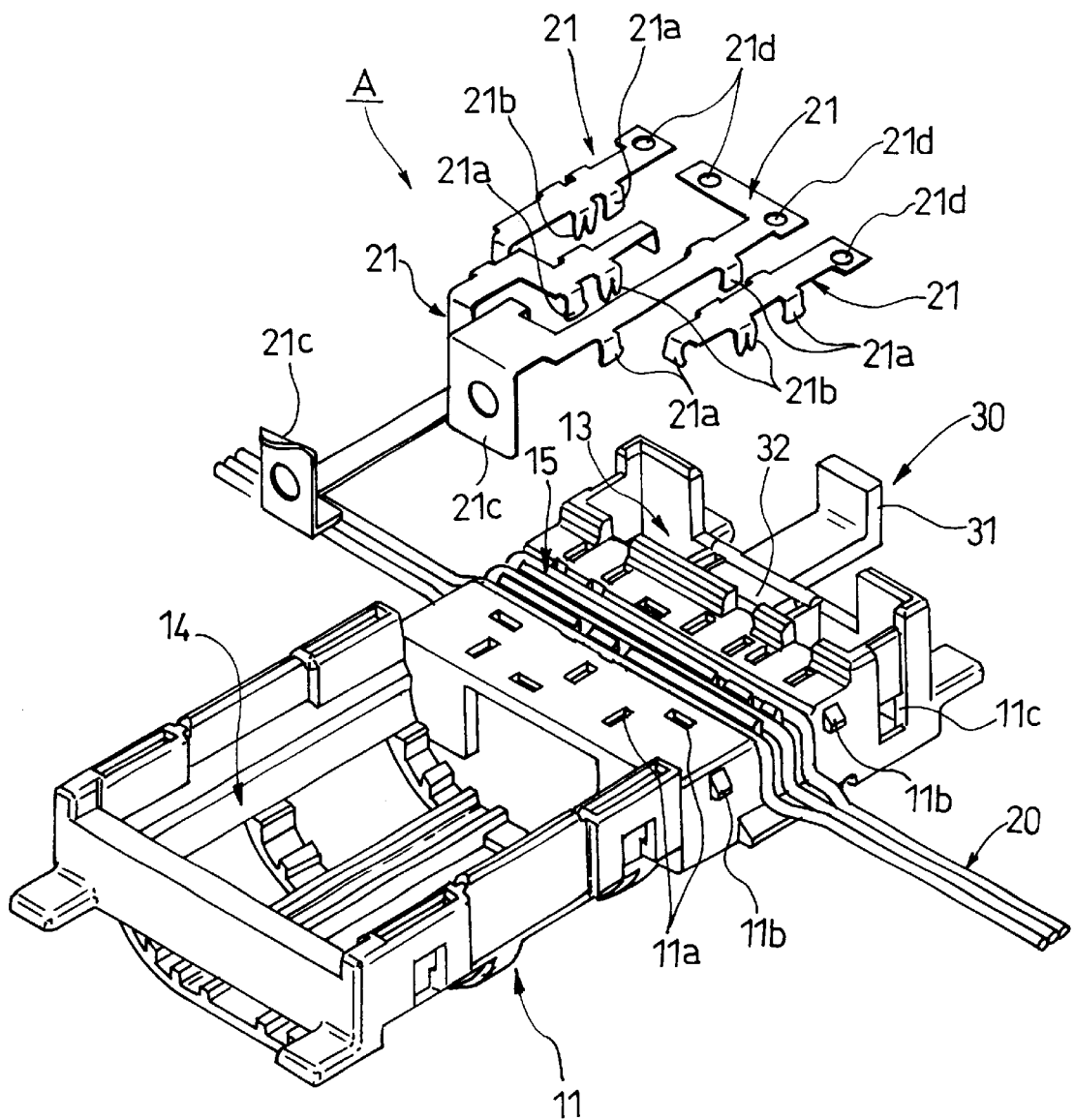
FIG. 4 is a perspective view of the essential portions for explaining the process of assembling the lamp function portion in the lamp unit shown in FIG. 1.

Next, as shown in FIG. 4, the plurality of bus bars 21 making up the switching circuit assembly are placed on the vehicle compartment-side surface (the upper surface in FIG. 4) of the insulating housing 11 where the FFC 20 is routed, and fitting pawls 21a provided projectingly on the bus bars 21 toward the mounting surface are respectively fitted and fixed to a plurality of fitting holes 11a.

In addition, a plurality of press connecting terminals 21b are appropriately provided projectingly on the respective bus bars 21 in correspondence with the wires of the FFC 20. These press-connecting terminals 21b are respectively made to undergo press fitting connection to the corresponding wires of the FFC 20 in conjunction with the fitting of the bus bars 21 to the insulating housing 11.

At this juncture, since the FFC 20 is routed in advance in the wire accommodating recess 15, the wires are positioned and held in the U-grooves 15a. Hence, it is possible to route and hold the FFC 20 with respect to the insulating housing 11, and positioning and holding become possible at the time the press-connecting terminals 21b of the bus bars 21 are subjected to press fitting connection to the respective wires.

Accordingly, the wires of the FFC 20 are difficult to undergo positional offset relative to the press-connecting terminals 21b at the time of the press fitting connection action, and the press fitting connection action at the time of the press fitting connection operation and the holding of the FFC 20 are facilitated, thereby improving the operating efficiency.

In addition, the bus bars 21 are provided with switch contacts 21d capable of switching over the operating state of the bulb 35 fitted in the insulating housing 11 by the switch assembly 30 accommodated in the switch accommodating recess 13 provided in the vicinity of the wire accommodating recess 15.

Accordingly, in conjunction with the mounting of the bus bars 21 in the insulating housing 11 in which the switch assembly 30 has been accommodated in advance in the switch accommodating recess 13, the corresponding switch contact 21d is able to form a switching circuit assembly together with the switch assembly 30.

Figure 5:
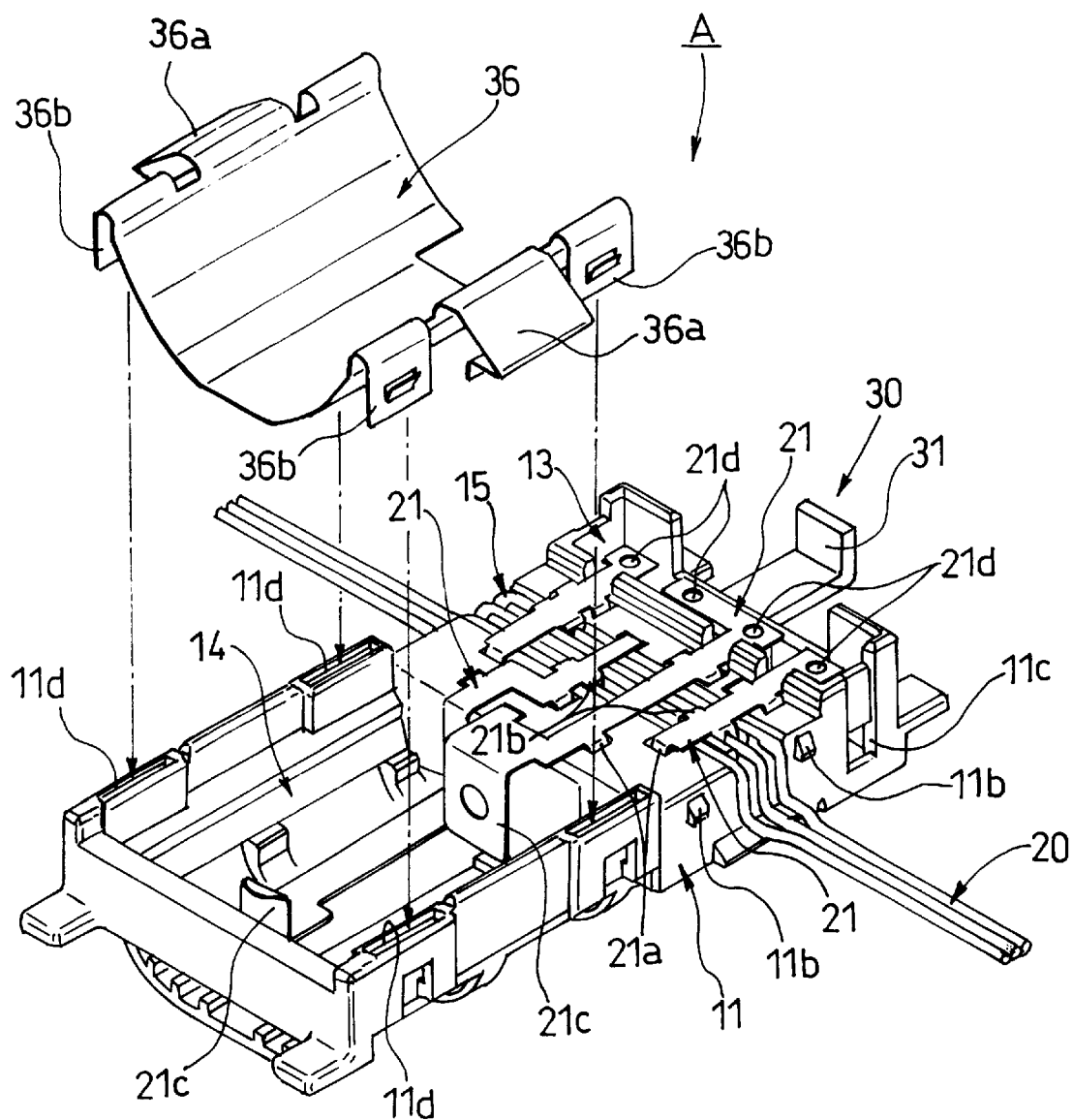
FIG. 5 is a perspective view of the essential portions for explaining the process of assembling the lamp function portion in the lamp unit shown in FIG. 1.

Next, as shown in FIG. 5, the reflector 36 is fitted to the bulb accommodating portion 14 of the housing 11 as housing retaining portions 36b are respectively engaged in reflector retaining holes 11d of the insulating housing 11. The reflector 36 is integrally formed by press forming or the like from a metal plate such as a stainless steel plate, and has the function of effecting optimum light distribution of the bulb 35.

Figure 6:
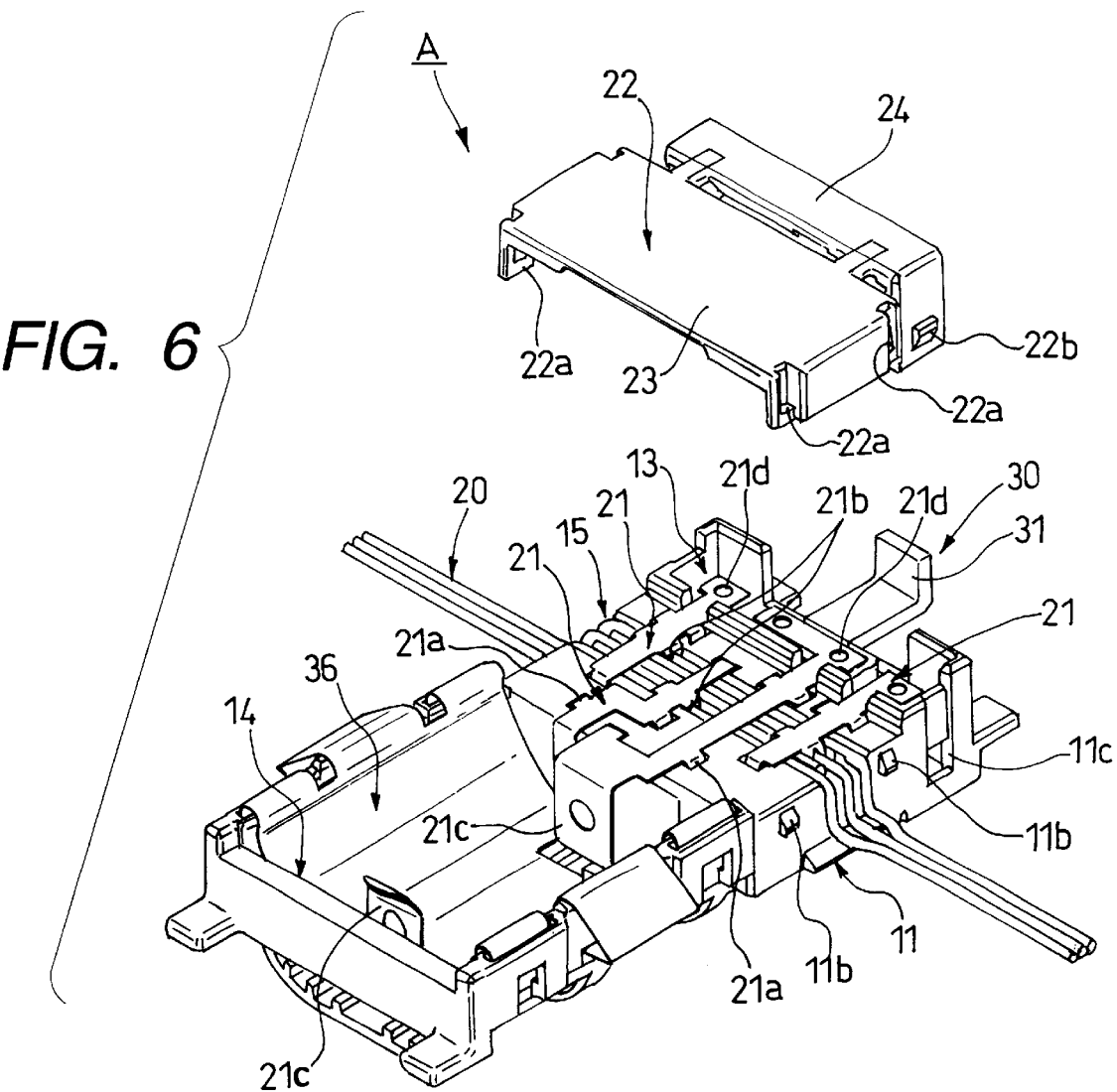
FIG. 6 is a perspective view of the essential portions for explaining the process of assembling the lamp function portion in the lamp unit shown in FIG. 1.

Next, as shown in FIG. 6, the cover 22 is installed and fixed to the vehicle compartment-side surface of the insulating housing 11 as fitting holes 22a and fitting projections 22b which are provided on side surfaces are fitted to cover fitting projections 11b and cover fitting holes 11c which are provided on the insulating housing 11.

In the installed cover 22, a strain relief portion 23 for covering and for holding and fixing the connected portions of the bus bars 21 subjected to press fitting connection to the wires which have been routed in the wire accommodating recess 15, as well as the switch cover portion 24 for displaceably and undetachably holding the switch assembly 30 in the switch accommodating recess 13, are formed integrally.

Namely, according to the room lamp 10 in accordance with this embodiment, since the switch accommodating recess 13 is provided in the vicinity of the wire accommodating recess 15 provided in the vehicle compartment-side surface of the insulating housing 11, both the connecting portions of the bus bars 21 subjected to press fitting connection to the wires of the FFC 20 routed in the wire accommodating recess 15 and the switch assembly 30 accommodated in the switch accommodating recess 13 can be simultaneously held and fixed by being covered with the single cover 22.

Then, as shown in FIG. 1, when the room lamp 10 of this embodiment is mounted in advance from the body ceiling side (the lower side in the drawing) of the roof trim 45 to form a roof module, the lamp function portion A connected to a predetermined position of the FFC 20 is first fitted in a lamp fitting window 46 which is open in the roof trim 45.

At this time, as for the lamp function portion A, since trim attaching portions 36a of the reflector 36 are respectively engaged resiliently with opposing open edges of the lamp fitting window 46, the lamp function portion A is directly fitted to the roof trim 45 without free play. Hence, the assembly of the lamp function portion A is facilitated.

Meanwhile, as shown in FIG. 1, the cover lens 40 making up the design portion B of the room lamp 10 is installed in such a manner as to cover from the vehicle compartment side (the upper side in the drawing) of the roof trim 45 the aforementioned lamp function portion fitted in advance to the lamp fitting window 46. Namely, the cover lens 40 is fitted in such a manner as to cover the lamp fitting window 46 of the roof trim 45 by causing engaging projections 40a to engage engaging holes 45a in the roof trim 45.

A switch knob 41 is slidably fitted in advance in the cover lens 40. When the cover lens 40 is fitted to the lamp fitting window 46, the switch knob 41 is engaged with a tip of the slider body 31, so that the slider body 31 is operated by means of the switch knob 41.

Accordingly, according to the room lamp 10 of this embodiment described above, when the lamp function portion A is assembled, in a state in which the FFC 20 is fitted in the wire accommodating recess 15 of the insulating housing 11 with the switch assembly 30 mounted therein, the bus bars 21 are mounted on the vehicle compartment-side surface of the insulating housing 11, and are concurrently subjected to press fitting connection to the FFC 20. Then, after the reflector 36 is fitted, the cover 22 covers the switch assembly 30 and the bus bars 21, and the bulb 35 is inserted between two bulb contacts 21c opposed to each other, thereby assembling the lamp function portion A, as shown in FIG. 1. Accordingly, all the component parts can be assembled from the same direction (from the direction of the vehicle compartment-side surface of the insulating housing 11) so that automatic assembly is facilitated.

Accordingly, the FFC 20 can be easily and accurately positioned with respect to the insulating housing 11, and the press connecting terminals 21b of the bus bars 21 can be reliably subjected to press fitting connection to the FFC 20.

Namely, at the same time as the assembly of the bus bars 21 onto the insulating housing 11, the press connnecting operation of the FFC 20 with respect to the press connecting terminals 21b can be effected easily and accurately, and it is possible to reduce the number of assembling steps and improve the reliability in connection.

In addition, the FFC 20, the bus bars 21, and the switch assembly 30 can be covered with the single cover 22, so that, as compared with the structure in which the cover is separately provided, the number of parts and the number of assembling steps can be reduced.

It should be noted that the wire connecting structure of the lamp unit and the arrangement of wires and the like in accordance with the invention are not limited to the arrangement of the above-described embodiment, and it goes without saying that various forms can be adopted in accordance with the gist of the invention.

For example, the wires which are routed in the interior wall member are not limited to the FFC of the above-described embodiment, and it is possible to adopt a flat circuit member such as a flexible printed circuit (FPC) board and a ribbon cable, as well as a wire harness or the like.

In addition, although in the above-described embodiment a description has been given of the case in which the room lamp 10 which is a lamp unit is installed on the roof trim, the invention is applicable to cases where a map lamp is installed on the roof trim, or a lamp unit such as a curtsey lamp is installed on a door trim serving as an interior wall member covering a vehicle body panel such as a door panel.

According to the above-described structure for connecting electric wires of a lamp unit in accordance with the invention, since the wire accommodating recess is formed in the vehicle compartment-side surface of the insulating housing in the lamp unit, and the wires are routed in advance in the wire accommodating recess, the routing and holding of the wires with respect to the insulating housing and the positioning and holding of the wire connecting terminals at the time of press fitting connection can be facilitated and made accurate.

Accordingly, it is possible to reliably prevent the positional offset of the wire connecting position due to an erroneous positioning of the wires and the vibrational offset and the like as a consequence of press connnecting action, thereby improving the assembling efficiency and quality of the lamp unit.

What is claimed is:

1. A structure for connecting an electric wire to a lamp unit installed on a lamp fitting window formed through an interior wall member covering a vehicle body panel, the lamp unit comprising:

a insulating housing having a vehicle compartment-side surface;

a wire accommodating recess, for positioning the electric wire installed on a vehicle body panel side of the interior wall member, provided on the vehicle compartment-side surface;

a wire connecting terminal subjected to press fitting connection to the wire positioned in the wire accommodating recess;

switch components; and a switch accommodating recess, for accommodating the switch components, provided in the vehicle compartment-side surface in a vicinity of the wire accommodating recess;

wherein the wire connecting terminal includes switch contacts for switching an operating state of a bulb attached to the insulating housing by the switch components accommodated in the switch accommodating recess.

2. The structure according to claim 1, wherein the wire connecting terminal includes a press connecting terminal for connection to the wire, and a bulb contact for contact to a bulb.

3. The structure according to claim 1, wherein when the wire is accommodated in the wire accommodating recess and is electrically connected to the wire connecting terminal, the wire is held between the wire connecting terminal and the insulating housing.

4. The structure according to claim 1, wherein a plurality of the wires are accommodated in the wire accommodating recess.

5. The structure according to claim 4, wherein at least one guide groove is formed in the wire accommodating recess to define a plurality of grooves for respectively accommodating the plurality of the wire.

* * * * *